United States Patent [19]
Brown et al.

[11] Patent Number: 4,870,752
[45] Date of Patent: Oct. 3, 1989

[54] CABLE HARNESS MANUFACTURING AND ELECTRICAL TESTING SYSTEM

[75] Inventors: Christopher K. Brown, Camp Hill; Carl L. Moyer, Mt. Penn; Joanne E. Shipe, Harrisburg; Herman D. Walter, Marysville, all of Pa.

[73] Assignee: AMP Incorporated, Harrisburg, Pa.

[21] Appl. No.: 258,241

[22] Filed: Oct. 14, 1988

Related U.S. Application Data

[62] Division of Ser. No. 132,310, Dec. 15, 1987.

[51] Int. Cl.$^4$ ........................ A01R 43/04; B23P 19/00
[52] U.S. Cl. ........................................ 29/866; 29/749
[58] Field of Search ................. 29/749, 858, 857, 755, 29/866

[56] References Cited

U.S. PATENT DOCUMENTS

| | | | |
|---|---|---|---|
| 4,110,880 | 9/1978 | Peppler et al. . | |
| 4,285,118 | 8/1981 | Peppler et al. . | |
| 4,359,257 | 11/1982 | Lopinski et al. . | |
| 4,410,229 | 10/1983 | Stephenson . | |
| 4,570,326 | 2/1986 | Meyer et al. . | |
| 4,575,935 | 3/1986 | Shields | 29/749 X |
| 4,580,340 | 4/1986 | Shields | 29/749 X |
| 4,682,391 | 7/1987 | Hall et al. . | |
| 4,733,463 | 3/1988 | Kolcinowski et al. | 29/749 X |

FOREIGN PATENT DOCUMENTS

| | | |
|---|---|---|
| 0164570 | 12/1985 | European Pat. Off. . |
| WO87/00355 | 1/1987 | European Pat. Off. . |
| 0212801 | 3/1987 | European Pat. Off. . |

OTHER PUBLICATIONS

AMP Customer Manual, CM 5576, "AMP 12-Wire Cable Assembly Machine," Oct. 1983, p. 2.
AMP Customer Manual, CM 5526, "AMP 8-Wire Cable Assembly Machine," Sept. 1984, pp. 7-8.
Technical Digest Western Electric, (1983), Jan., No. 69, "Apparatus for Testing Modular Adapters" pp. 9-10, EM Hutchins.
Data Sheet DuPont Electronics "IDC Handling System QP113".

*Primary Examiner*—Howard N. Goldberg
*Assistant Examiner*—Carl J. Arbes

[57] ABSTRACT

Method and apparatus for the simultaneous manufacturing and testing of a cable harness assembly having one, or a plurality of spaced apart connectors, of the insulation displacement type, terminated to a planar multi-conductor cable. The system can be programmed to cut or shear the cable immediately after a test thereof fails to verify an appropriately terminated connector or continuity in the cable, or after the cable harness assembly length is reached. By such a system, a minimum of cable is lost to scrap due to the failed electrical testing thereof.

9 Claims, 13 Drawing Sheets

PREFERRED PROGRAMMING SEQUENCE
(3 CONNECTOR HARRNESS ASSEMBLY)

FEED CABLE TO 1ST CONNECTOR
TERMINATE, 1ST CONNECTOR
RELEASE PRESS
CHECK FOR SHORTS
IF SHORTED, SHEAR CABLE AND EJECT
IF NOT, FEED CABLE TO 2ND CONNECTOR
TERMINATE 2ND CONNECTOR
CHECK CONTINUITY BETWEEN CONNECTORS
RELEASE PRESS
CHECK FOR SHORTS
IF SHORTED OR OPENED, SHEAR CABLE AND EJECT
IF NOT, SHEAR CABLE, FEED CABLE TO 3RD CONNECTOR
TERMINATE, 3RD CONNECTOR
CHECK CONTINUITY BETWEEN 1ST AND 3RD CONNECTOR
RELEASE PRESS
CHECK FOR SHORTS
IF SHORTED OR OPENED, EJECT
IF NOT, ACCEPT
REPEAT ASSEMBLY OPERATION

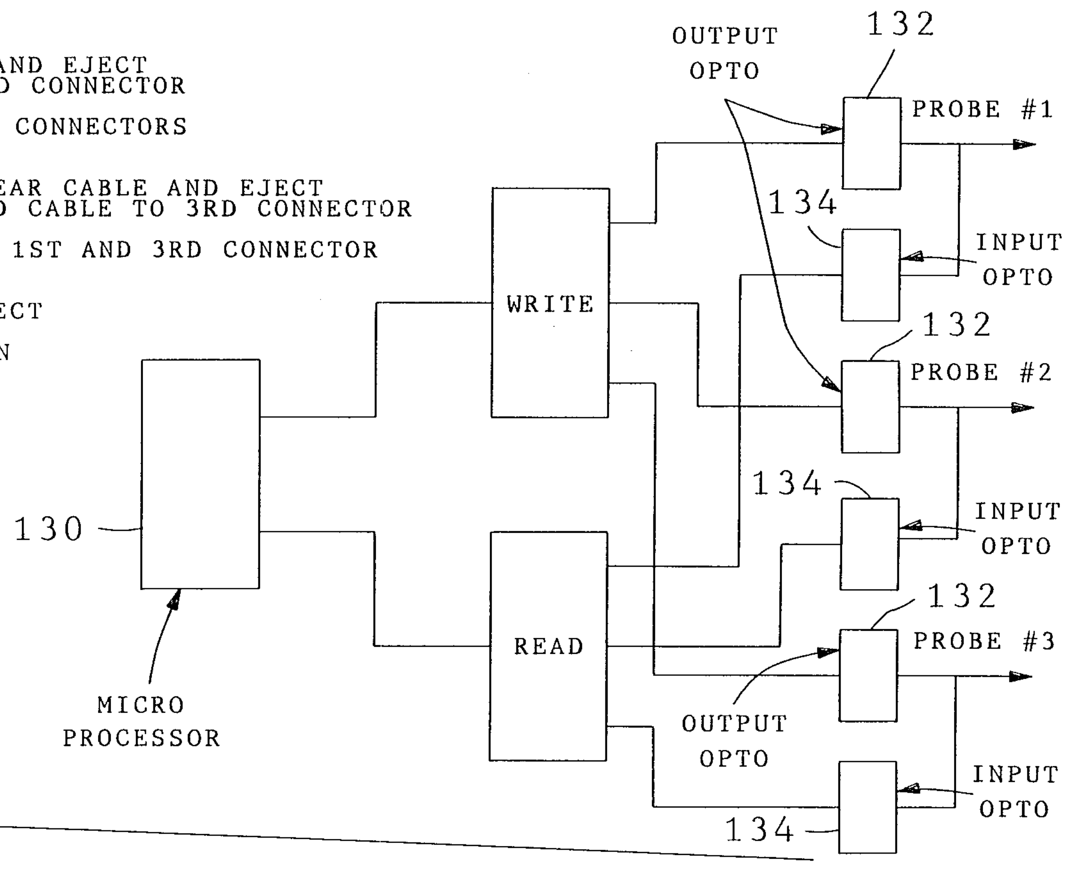

FIG. 10

CABLE HARNESS MANUFACTURING AND ELECTRICAL TESTING SYSTEM

This application is a divisional of application Ser. No. 132,310 filed Dec. 15, 1987.

FIELD OF INVENTION

This invention is directed to apparatus and the method for applying one or more connector assemblies with insulation displacement terminals to planar multi-conductor cable, while simultaneously testing such terminals and cable for short and/or open circuits, and continuity within said cable.

BACKGROUND OF THE INVENTION

The present invention relates to a system for producing a cable harness assembly, and to the electrical testing thereof. Cable harness assembly apparatus for applying connectors having insulation displacement terminals (IDC) to planar, multi-conductor cable are well known. U.S. Pat. No. 4,570,326 to Meyer et al teaches such cable harness assembly apparatus. The apparatus thereof is of the type comprising a workstation with a press having a termination ram and a plurality of connector receiving fixtures including a lead fixture which receives the connector to which the cable is first terminated. The fixtures are mounted to a frame at predetermined intervals, where preassembled connectors of the type disclosed in U.S. Pat. Nos. 4,359,257 to Lopinski et al and 4,410,229 to Stephenson, are placed in such fixtures, and the cable is threaded through the connectors before advancing the frame through the workstation, stopping the fixtures sequentially thereat to terminate the cable to the connectors. One disadvantage of such apparatus is that it is cumbersome and not well suited for automation.

A system more suitable for automation is taught in U.S. Pat. No. 4,682,391 to Hall, Jr. et al. The system thereof includes a plurality of stop means to control the connector fixtures into and out of the workstation in which the connector terminations occur. The various stop means are interlocked with different operations, i.e. connector termination, cable shearing, etc. Thus, such system is more readily adapted to automation.

U.S. Pat. No. 4,110,880 to Peppler et al represents an early effort to apply electrical testing in conjunction with harness making. As more clearly illustrated in the sequential steps of assembly of FIGS. 5A through 5I of the patent, a measured length of flat flexible cable is terminated at its respective ends and tested for shorts and continuity between the two end connectors. If a positive readout is obtained, covers are applied to the end connectors to produce a completed cable harness assembly.

Such testing system reveals a number of obvious disadvantages. For example, as a result of the step of first preparing measured lengths of cable, such entire length is lost if a short is detected during testing. Thus, this system can be costly from a material standpoint. Further, the operation to test a single cable assembly can be quite time consuming. The sequence of steps shows considerable back and forth movement. Briefly, the first end connector is crimped by means of a press, then tested. The second end connector is then moved under such press for crimping and testing. If positive readouts are obtained, the first end is then returned to the press for application of a cover to the crimped coneector. Such is repeated for the second connector. In an age of high speed automation, such a system is unacceptable.

The present invention provides for an efficient system for terminating and testing planar multi-conductor cable, which is fast, automated, and versatile. The advantages of such a system will become apparent in the description which follows, particularly when read in conjunction with the accompanying drawings.

SUMMARY OF THE INVENTION

This invention is directed to apparatus, and to the method of using same, to manufacture and test a cable harness assembly in which at least one of an insulation displacement type connector is terminated to a planar multi-conductor cable. The manufacturing and testing hereof are coordinated such that said cable is cut after the leading connector has been terminated and prior to the final connector termination, if a plurality of connectors are used in the harness assembly, or after the testing thereof fails to verify an appropriately terminated connector, or continuity, such as between terminated connectors, whichever situation shall first occur. By this system, a minimum of cable is used prior to a negative test. This is in contrast to prior art systems in which a full length of cable is cut before testing thereof is conducted.

BRIEF DESCRIPTION OF THE DRAWINGS

FIG. 10 is a block level schematic of the electrical circuitry of the present invention, including a preferred programming sequence.

DETAILED DESCRIPTION OF PREFERRED EMBODIMENT

Figure 1:
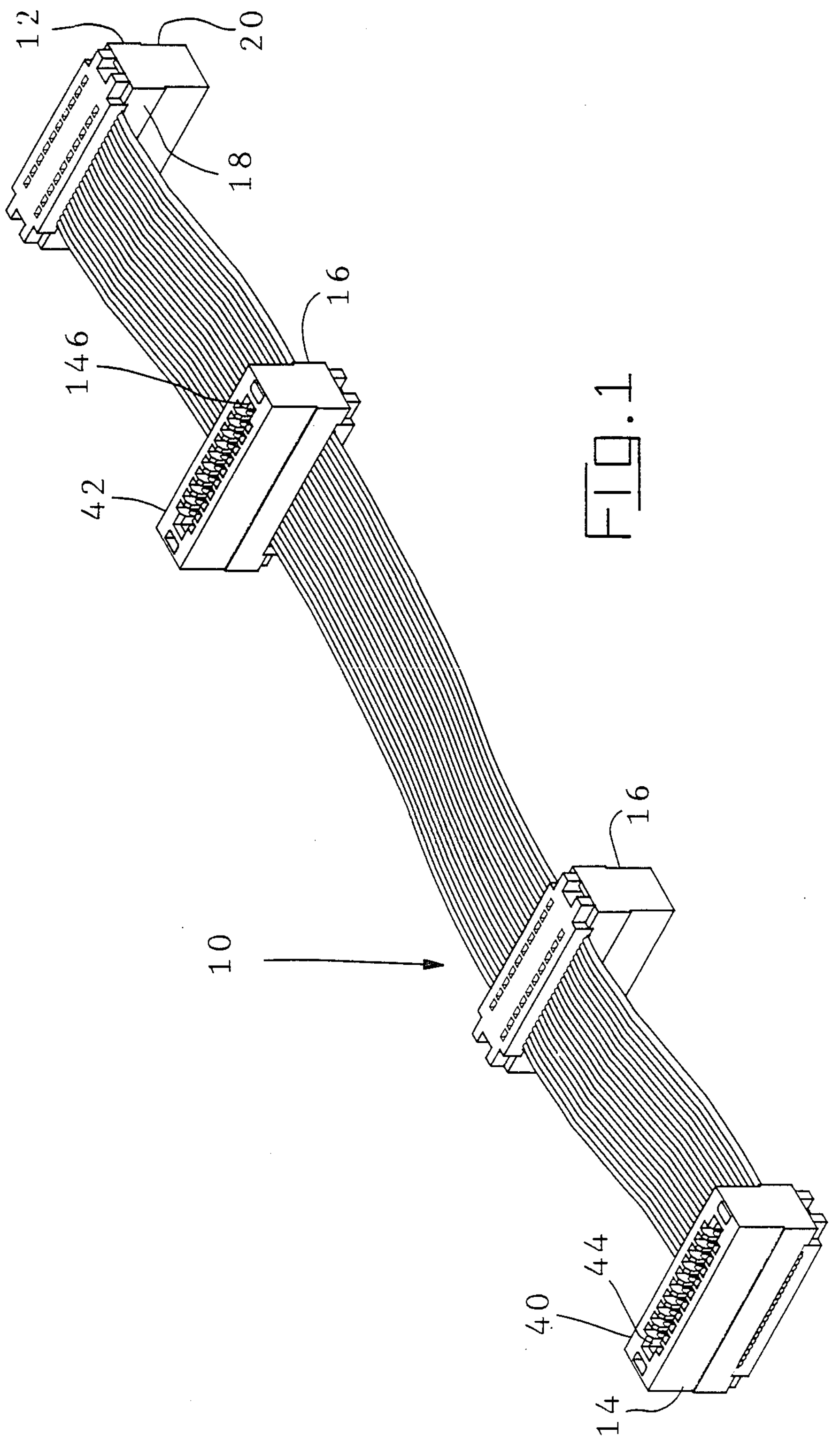
FIG. 1 is a perspective view of a cable harness assembly produced by the method of this invention on the apparatus hereof.

The present invention is directed to a system for the simultaneous manufacturing and testing of a cable harness assembly. More particularly, in its preferred embodiment such invention relates to the production of assembled electrical connectors on a planar multi-conductor cable where a series of insulation displacement connectors are attached at spaced intervals along such cable in daisy chain fashion. An exemplary assembly according to this invention is illustrated in FIG. 1. The assembly 10, which for a typical application may be about twelve inches in length, preferably contains end connectors 12,14, and optionally one or more intermediate connectors 16,16', the construction of which is essentially identical.

Figure 2:
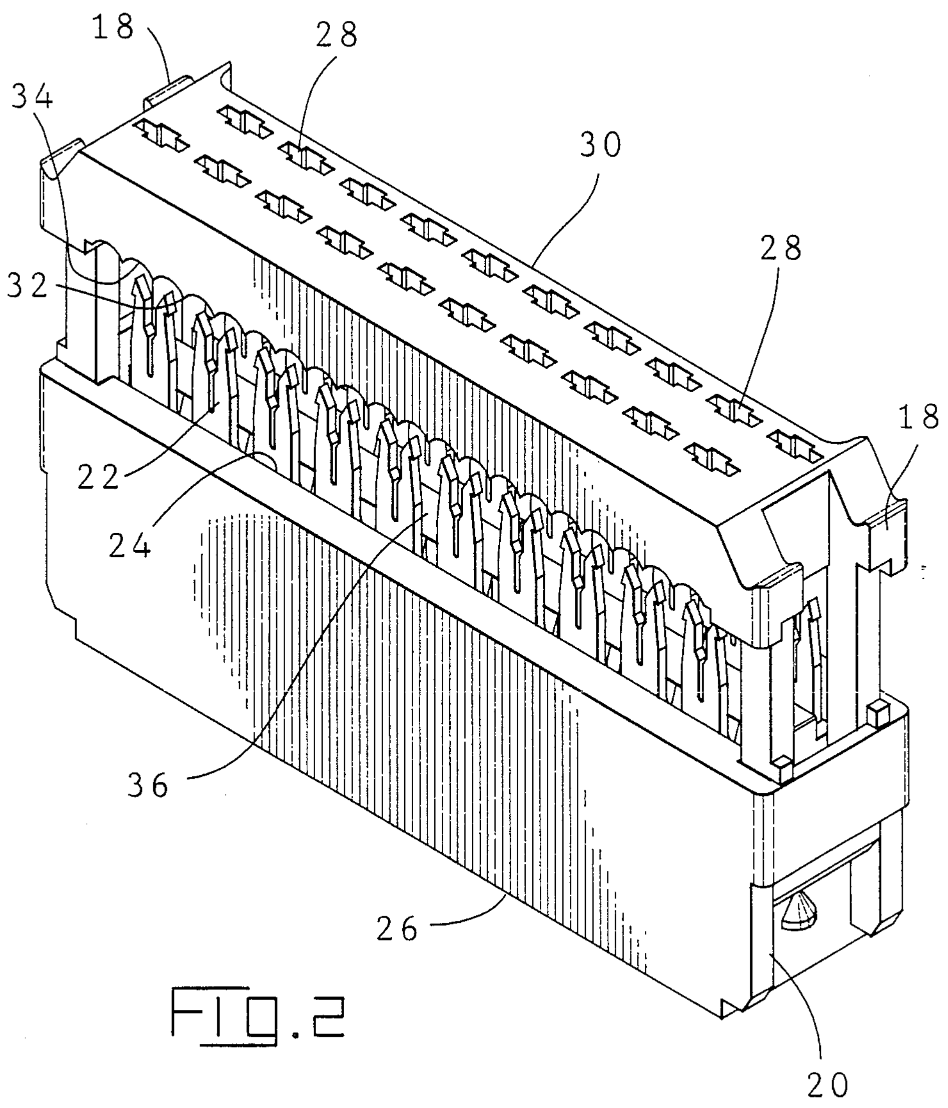
FIG. 2 is a perspective view of a preferred preassembled connector used in the practice of this invention to produce the cable harness assembly illustrated in FIG. 1.

In the operation of this invention, a preassembled connector, as shown in FIG. 2, is preferably used. Such connector is more fully described in U.S. Pat. No. 4,410,229, the disclosure of which is incorporated herein by reference. Briefly, such connector comprises a cover 18 and a base 20, both of which are formed of rigid insulative material, such as plastic. The base has a plurality of terminals 22 mounted in terminal passages 24 extending through and communicating with the bottom surface 26. It is through such terminal passages, via bottom surface 26, that an electrical probe, to be discussed hereinafter, is brought into electrical engagement with the connector. However, the operability of this invention does not rely on this specific structure for the connector. As illustrated by the connectors 14,16' of FIG. 1, the surfaces 40,42 may be characterized by a rectangularly shaped opening 44,46 into which a printed circuit board simulated probe may be inserted to verify an appropriately terminated connector.

Returning now to the embodiment illustrated in FIG. 2, the cover 18 contains a like number of terminal receiving passages 28 as the base 20, each aligned to receive a respective terminal 22. In the manner of the base 20, such passages 28 extend through and communicate with the upper surface 30. The mating surface 32 of the cover 18 is scalloped 34 to receive and align the planar multi-conductor cable inserted through the opening 36. When such cable is properly aligned, termination of the cable, such as by firmly pressing the base 20 towards and against said cover 18, will cause the terminals 22 to pierce the insulation about the respective cable conductors thereby bringing each such terminal into electrical contact with its respective conductor.

Figure 3:
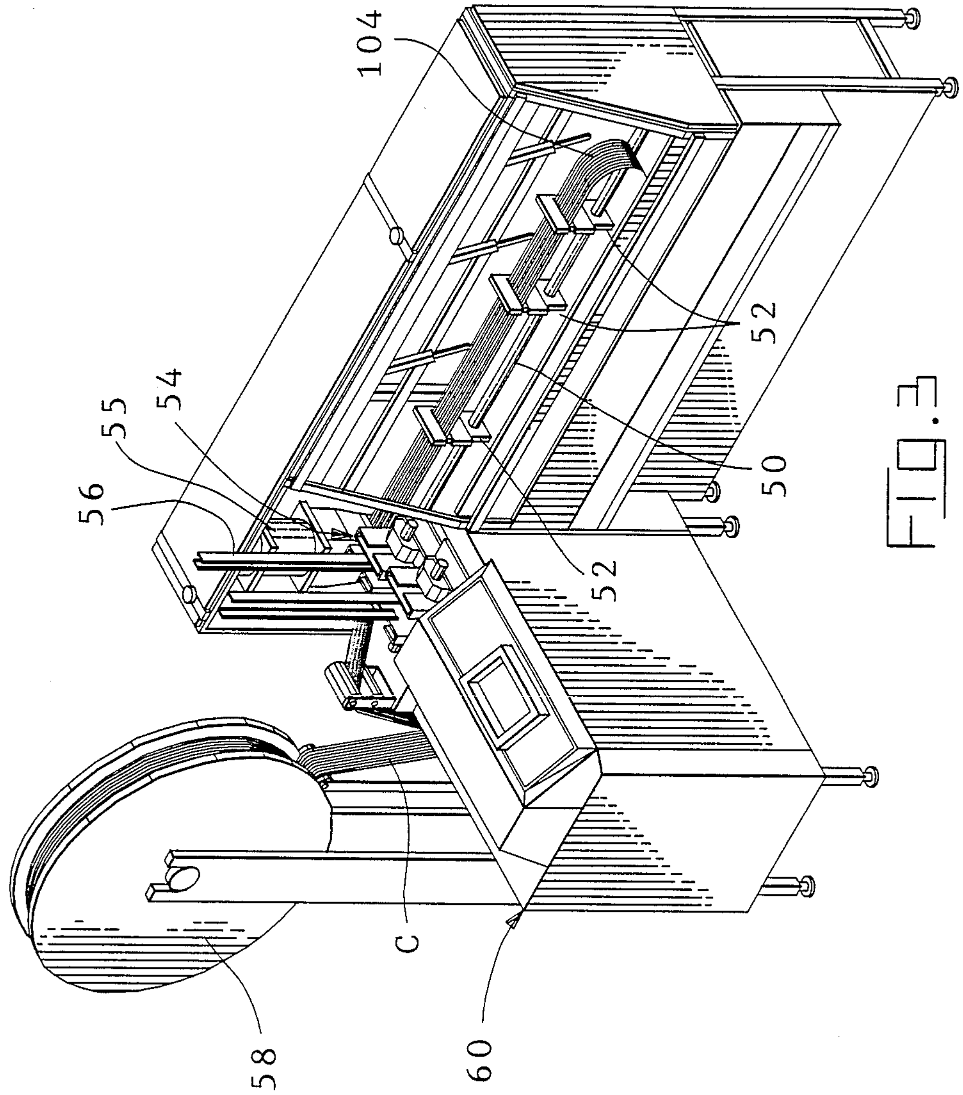
FIG. 3 is a perspective view of the entire harness assembly and testing apparatus according to the present invention.

A preferred apparatus to produce the cable harness assembly illustrated in FIG. 1, is shown in FIG. 3. Such apparatus includes a guide rail 50, extending transversely of the apparatus, a plurality of connector carrying carriages 52 movable along said rail, a work station 54, which includes among other features connector feeding units or columns 56, and a dereeler 58 for supplying planar multi-conductor cable C to the apparatus. Other features of the work station 54, such as the connector termination press and shear, will be described later.

The left portion or short leg 60 of the apparatus of FIG. 3 is that part of the structure which supports the connector feed units or columns 56 on its top and houses the electrical controls.

Figure 4:
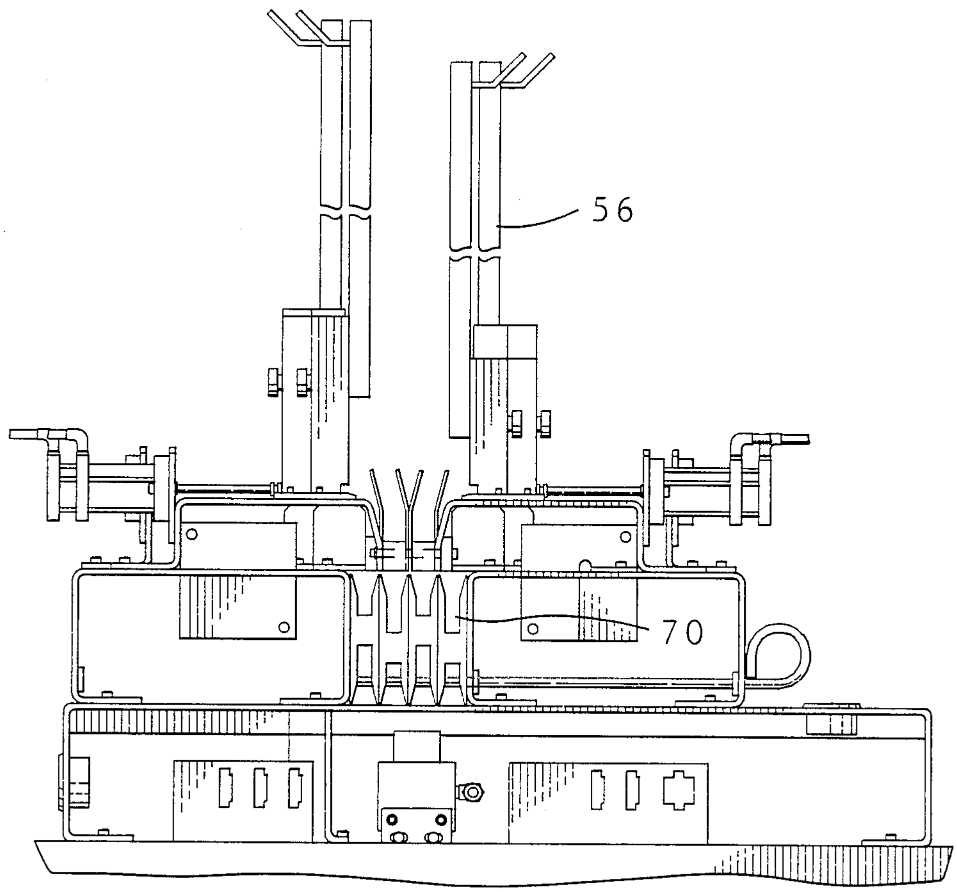
FIG. 4 is a vertical transverse sectional view illustrating the connector loading station.
Figure 5:
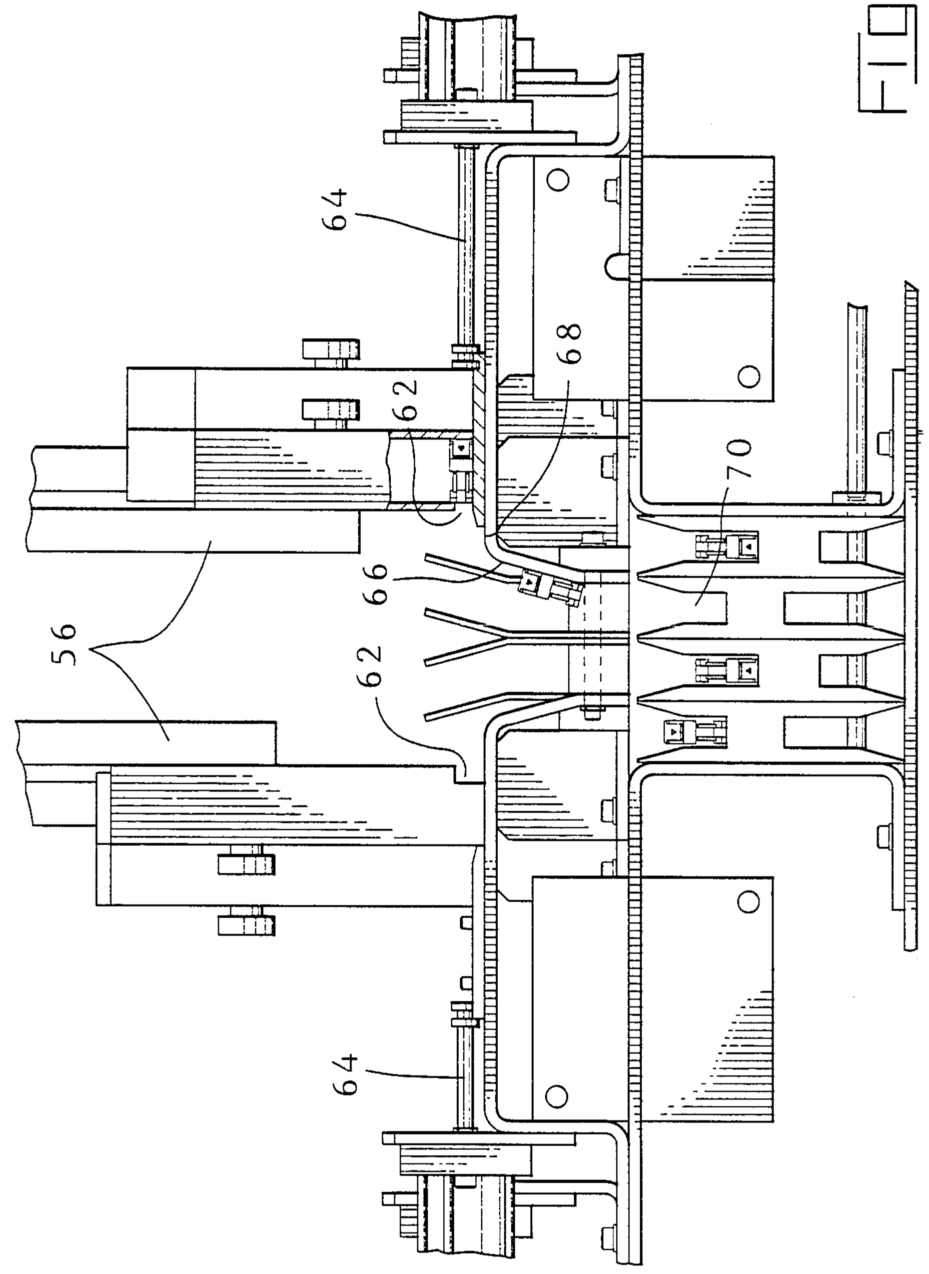
FIG. 5 is a similar view to FIG. 4, but enlarged to show further details of the connector loading station.

Considering further the details of the workstation 54, as illustrated in FIGS. 4 and 5, it will be observed that one feature thereof is the loading of connectors for termination to the cable. The connector feeding system consists of four columns 56, each servicing one connector for the cable harness assembly. The number of columns 56 represent the maximum number of connectors for each such assembly. The connectors, stacked broad side down, are gravity fed down each column 56 to an escapement 62 at the base thereof. Such escapement 62 allows selection of the bottom connector which is pushed, such as by ram 64, over the edge 66 of the platform 68 so that the connector rotates 90 degrees (see FIG. 5) and drops into the load guide 70. With the connectors, either cover up or cover down, as determined in advance for the specific cable harness assembly, a loading ram may be activated to push all connectors simultaneously into the corresponding connector module. This will all become clearer with the further discussion of such module. However, one of the features of this invention is the capability to abort the assembly process where an improperly terminated connector or open circuit is detected. Accordingly, it may not be necessary to load connectors in each module following such abortion or premature termination of operation. For such a situation, the apparatus hereof is characterized by the further capability of the selective activation of each pusher ram 64 to push the desired connector into the load guide 70. Thereafter, such loading ram may be activated to load the empty module(s).

In automatic operations, such as the system of this invention, it is often desirable to be able to verify that various components are aligned as desired. Accordingly, photosensors may be used, one for each column 56, to verify that the connectors have dropped into the load guides to thereafter be driven by a loading ram into the connector modules and seated against locating surfaces in such modules.

The dereeler 58, shown in FIG. 3, is essentially conventional in that its primary purpose is to provide an endless supply of cable C to the apparatus hereof. To achieve this result, the dereeler 58 operates in association with a pair of fixed pulleys, and a weighted dancer pulley which travels vertically between said pair to provide a loop of cable C. In operation, as the cable C is pulled into the apparatus, the dancer pulley is lifted toward said fixed pulleys. At some point or elevation, the dancer pulley activates a switch which turns on the motor of the dereeler 58. The dereeler feeds cable until the loop is full again, i.e. dancer pulley has descended to some lower point or position, and activates a turnoff switch.

Figure 6:
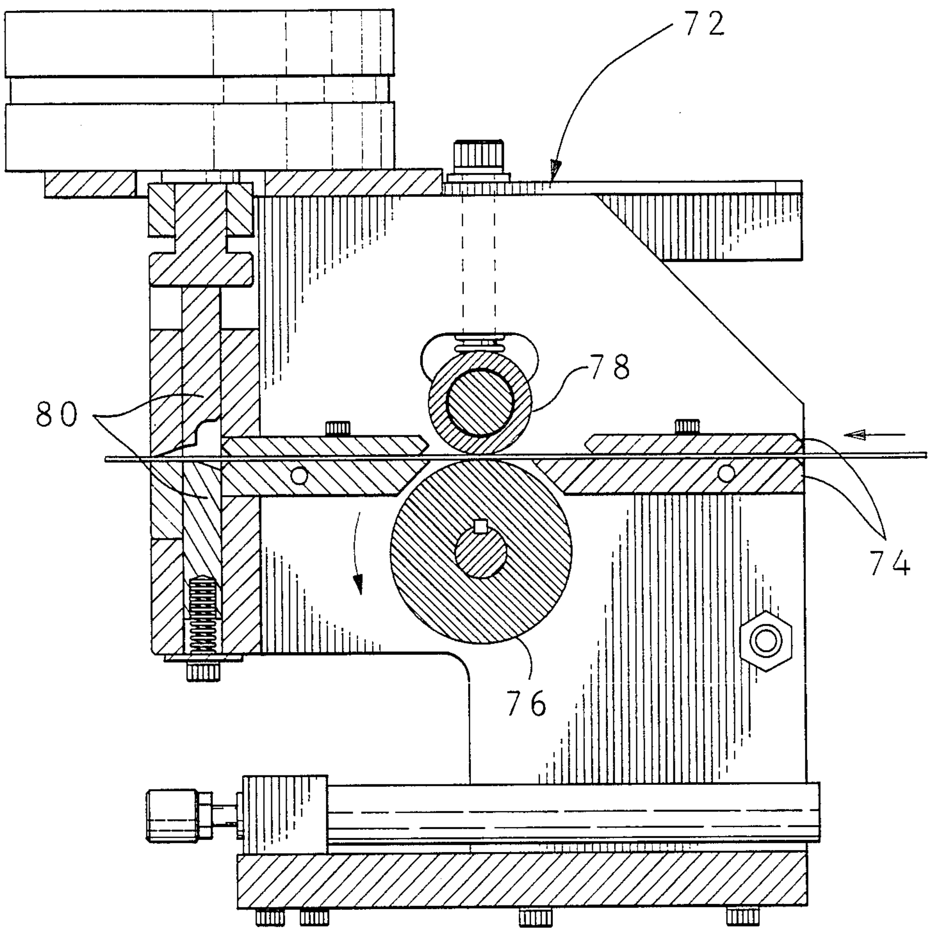
FIG. 6 is a sectional view of the shear unit of this invention, showing the feeding of a cable therethrough.

The shear unit 72, another component of the work station, is shown in FIG. 6. Such unit includes platform guides 74 for the cable C, driven roller 76, in cooperation with the idler roller 78, where such cooperation may be defined as a pinch roller feeder, for threading the cable between shear blades 80 and through the aligned connectors downstream of the blades 80. The driven roller 76 continues the feed thereof until the cable end is properly located in the leading connector 14. A sensor may be used to verify the completion of this stroke.

A final component of the work station 54 is the press for terminating connectors. The press, conventional in construction and operation, actually consists of two presses, only one of which is operated for any given connector termination. As noted previously, the apparatus of this invention is designed to produce cable harness assemblies with connectors in one of two orientations, namely, cover up or cover down. The converse of this is housing down or housing up, respectively. Thus, for termination of a connector, only the press on the housing side of the connector is actuated and the other press acts as a back up.

The press may be operated by an air cylinder, which drives a ram. Means, such as adjustable collars on a shaft, may be incorporated to limit or control the closing height of the ram, a height determined in advance to properly terminate the selected type and size of connector.

Figure 7:
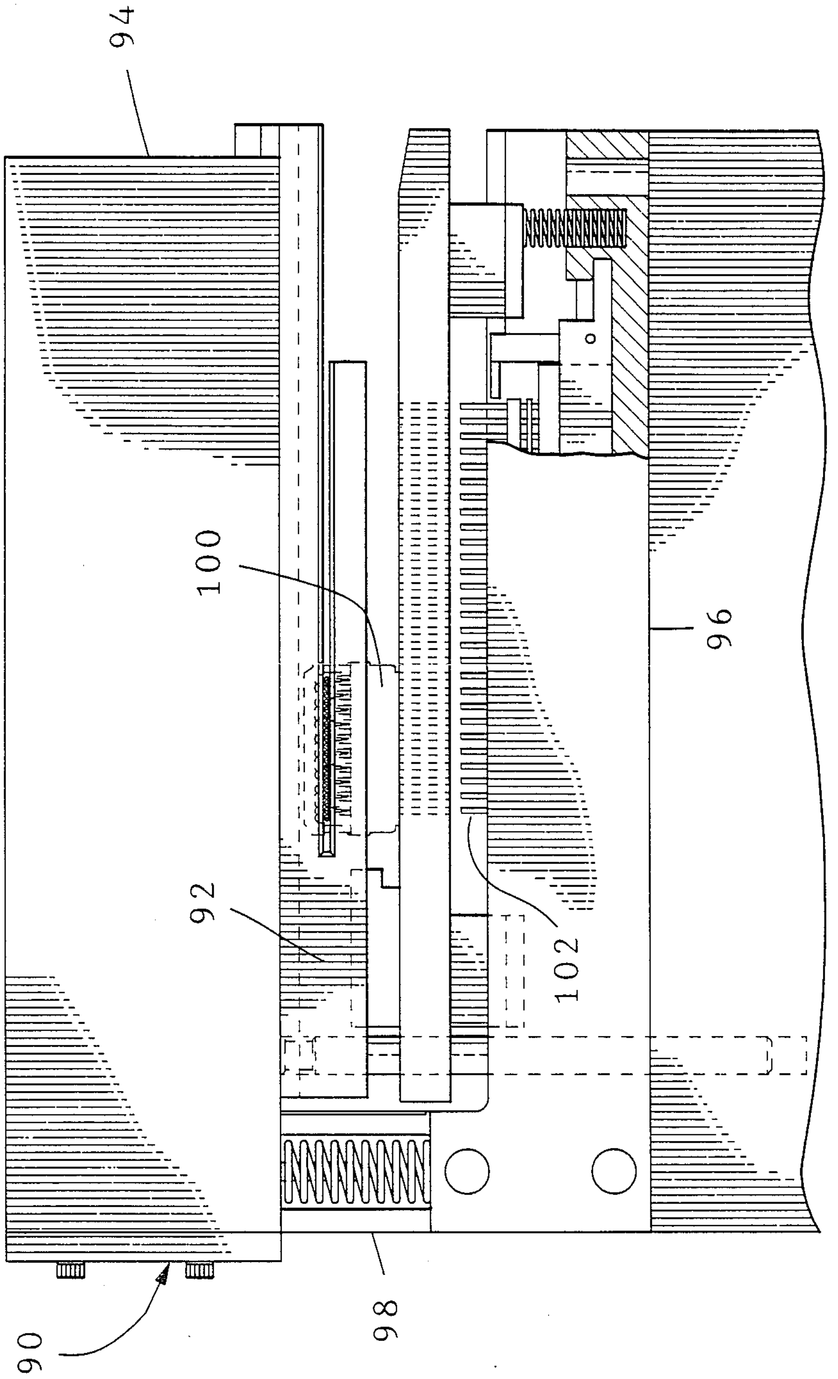
FIG. 7 is an enlarged partial cutaway end view, respectively, of a connector module, containing the tooling inserts and a representative connector.

A connector module 90, which accepts and supports tooling inserts 92 within a carriage, is shown in section in FIG. 7. Each module 90 can be adapted with a variety of inserts to accept a comparable variety of connectors. The module 90 consists of two housing portions 94,96 joined by a slide 98 so that they form a C-shaped cavity to accept the connector inserts 92. The inserts 92 locate the connector 100 relative to the centerline and first position of the cable. The modules 90 can be mounted to the carriage to orient the connector cover up (housing down) or cover down (housing up). In FIG. 7, the connector is oriented in a cover up position. The housing side, i.e. bottom, has provisions for mounting probes 102 for electrical checking in a manner that is well known in the art. See, for example, the aforementioned U.S. Pat. No. 4,110,880 which issued to Pepper et al.. During the press stroke, from the connector housing the probes for the electrical testing thereof are inserted into the connector and locked in position. Insofar as the leading connector is concerned, this connector-probe relationship remains until there is a failure in the testing thereof, or a full workable cable harness assembly is produced.

While the electrical circuitry will be described in more detail later, it will be noted that a multi-conductor flexible cable 104 (FIG. 3) is attached to the housing side of the leading connector in the lead carriage. Such cable is in electrical contact with the probes therein.

The apparatus of this invention is capable of utilizing a plurality of carriages, the function of which is to support, locate and transport a connector module 90 along the rail 50. The number of such carriages equals the maximum number of connectors, four in this exemplary showing, applied to the cable harness assembly. The carriages are mounted on the horizontal rail 50. The first or leading connector is attached to a timing belt which is driven by a stepping motor, the construction of which are well known. The intermediate and trailing connector carriages, if used, are free to slide along such rail 50.

For the start of the operation it may be convenient to consider the press location as the starting point. This is the location at which the first termination and testing is accomplished. To insure that the carriage mounted connectors are properly aligned for termination, a carriage advance gate is provided to sequentially advance such carriages into alignment with the upper and lower press. Such system includes two pins independently driven by air cylinders to allow advancing one carriage at a time to the press location.

Figure 8:
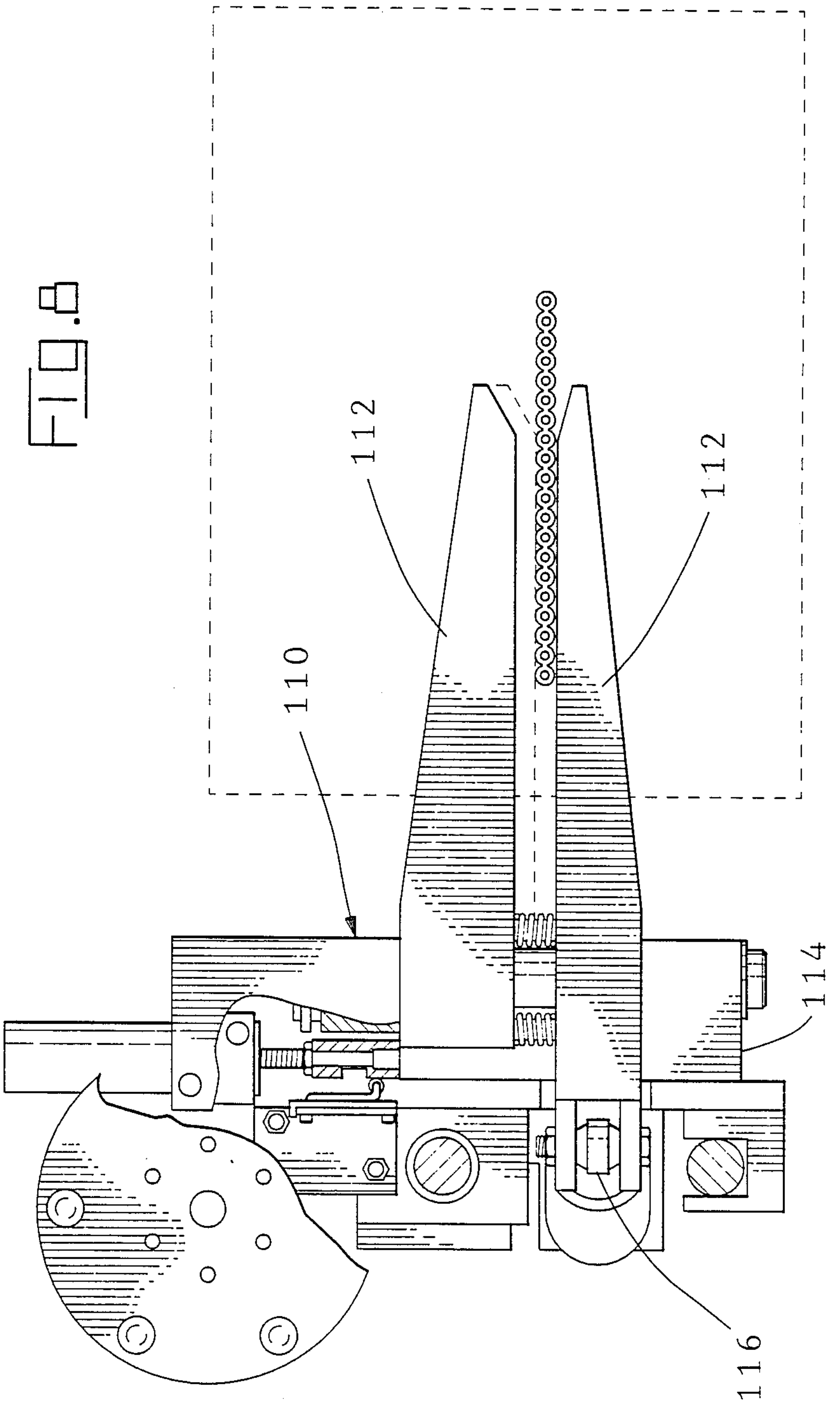
FIG. 8 is a side elevation, partially in section, of an auxiliary cable support.

As noted earlier, the present invention includes apparatus for making cable harness assemblies, in which the cable length may be varied significantly. In those situations where a long cable assembly is being produced, it may be necessary to provide support for the cable assembly during the manufacture thereof. Reference is hereby made to FIG. 8 which shows an auxiliary cable support 110 for use in conjunction with the apparatus of this invention. Specifically, the support 110 is used to provide drag or support for a long cable as it is sheared, to prevent cable sag that could mislocate the cable end in the last or trailing connector. The support 110 may consist of a clamp 112 mounted on a track cable cylinder 114 parallel to the tooling modules. When a long cable is to be sheared, the clamp 112 is pivoted 116 into position with the cable between the jaws of the clamp 112, and the clamp closes (phantom position) to hold the cable. A stepper motor then moves the cable into position for the termination of the next or trailing connector. After such termination, the clamp 112 opens and pivots out of position to expose the cable.

It should be understood that other types of auxiliary cable supports may be used to provide the same support or drag as the pivotal clamp described above. For example, the jaws of a clamp may move in a direction perpendicular to the cable to capture same between such jaws. When the cable harness assembly is complete, the jaws may be relaxed and withdrawn therefrom to free the cable.

The sequence depicted in FIGS. 9A to 9H schematically illustrate the steps of manufacturing and testing a cable harness assembly according to a preferred practice of this invention.

Figure 9A:
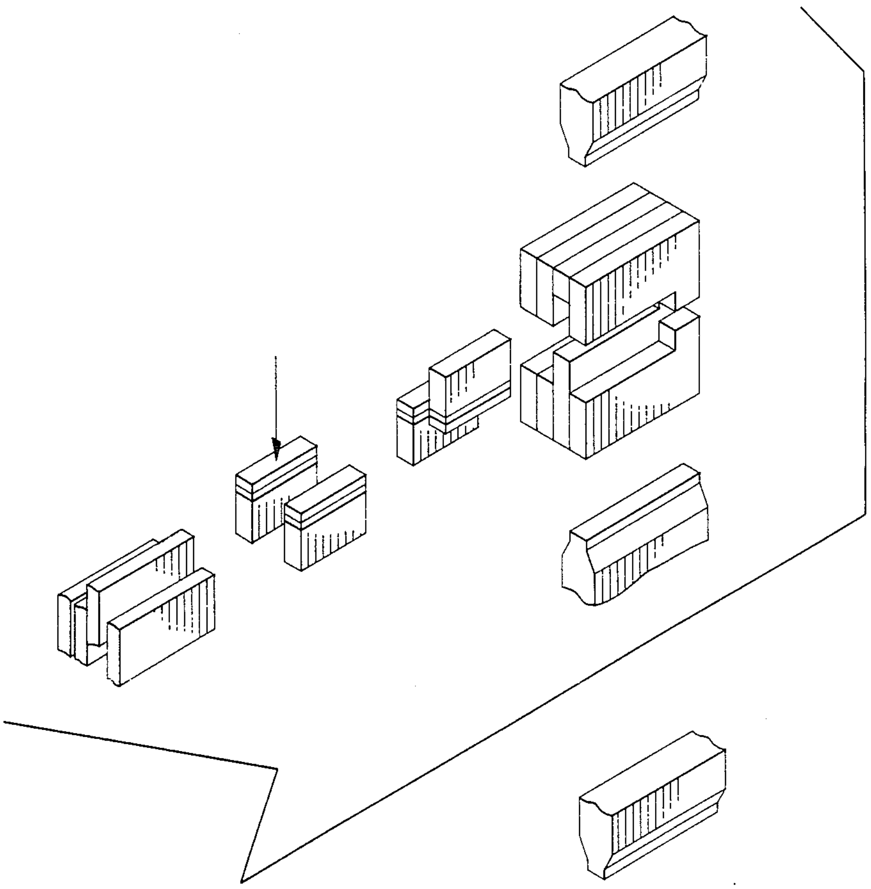
FIGS. 9A through 9H are a series of simplified schematic drawings illustrating the sequence of operation used in the practice of this invention.
Figure 9B:
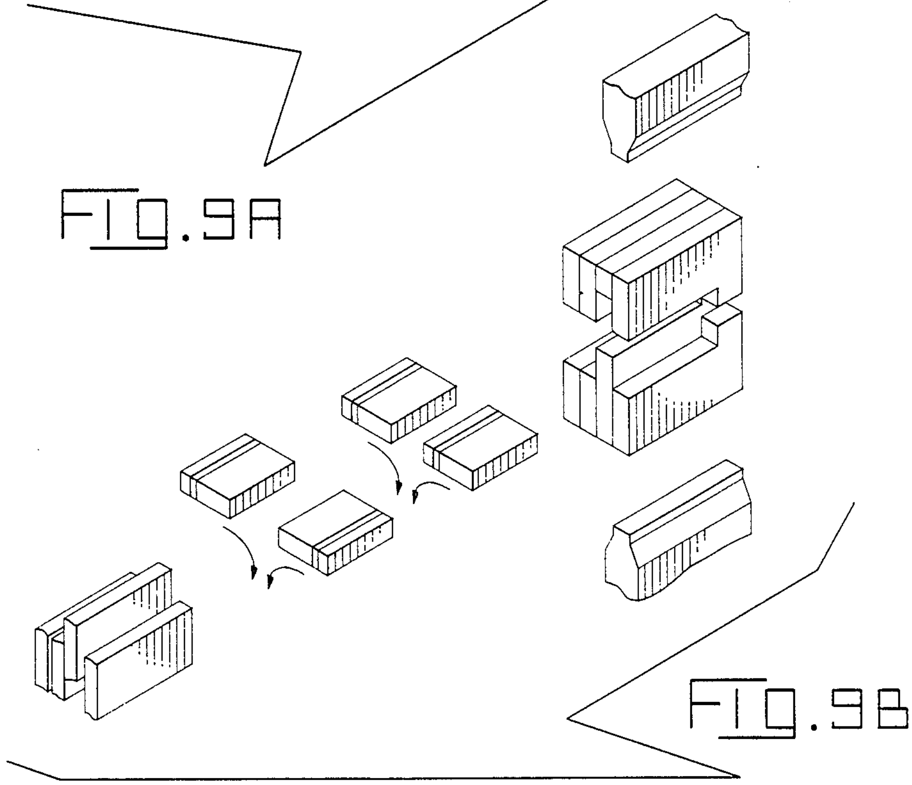

In preparing for the manufacture thereof, all connectors required for one cable assembly, if multiple connectors are used, are selected and aligned beside each other in the sequence that they will have in the cable assembly. For this exemplary illustration, FIG. 9A shows four such sequenced connectors in a position just prior to them rotating 90 degrees and being deposited for transfer into the connector modules. FIG. 9B shows the rotated and aligned connectors.

Figure 9C:
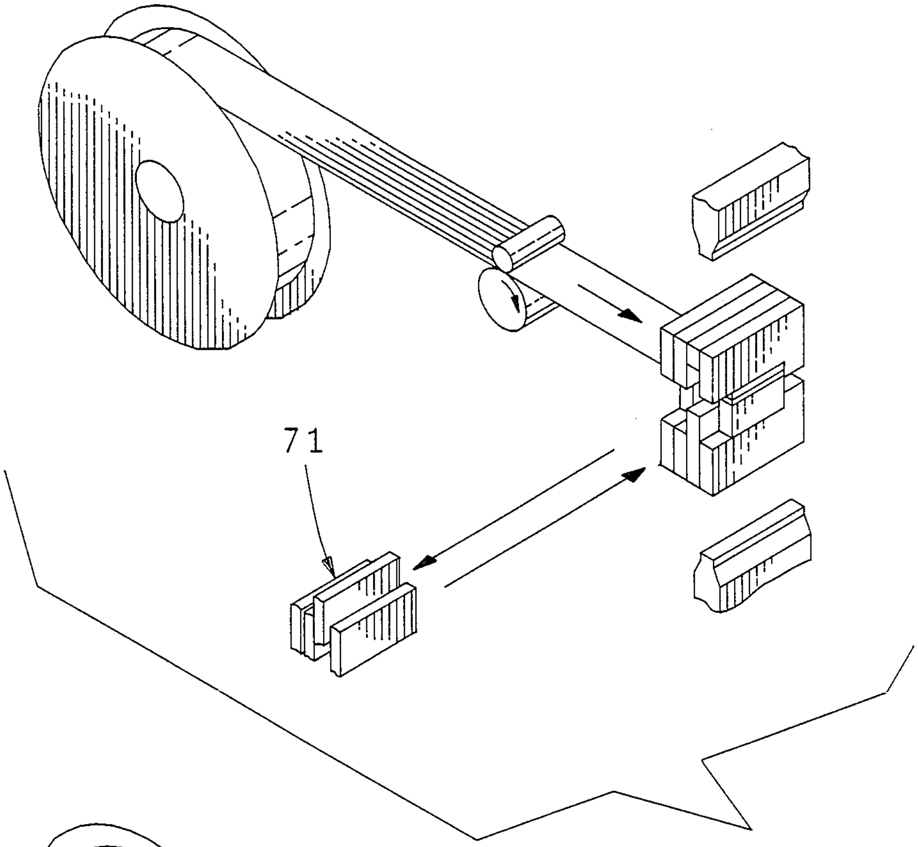

The connectors are then inserted into their respective modules. As shown in FIG. 9C, the cable is then fed from the dereeler through the module aligned connectors until the leading end of the cable is properly located for termination in the leading connector, i.e. the connector farthest from the cable source.

Figure 9D:
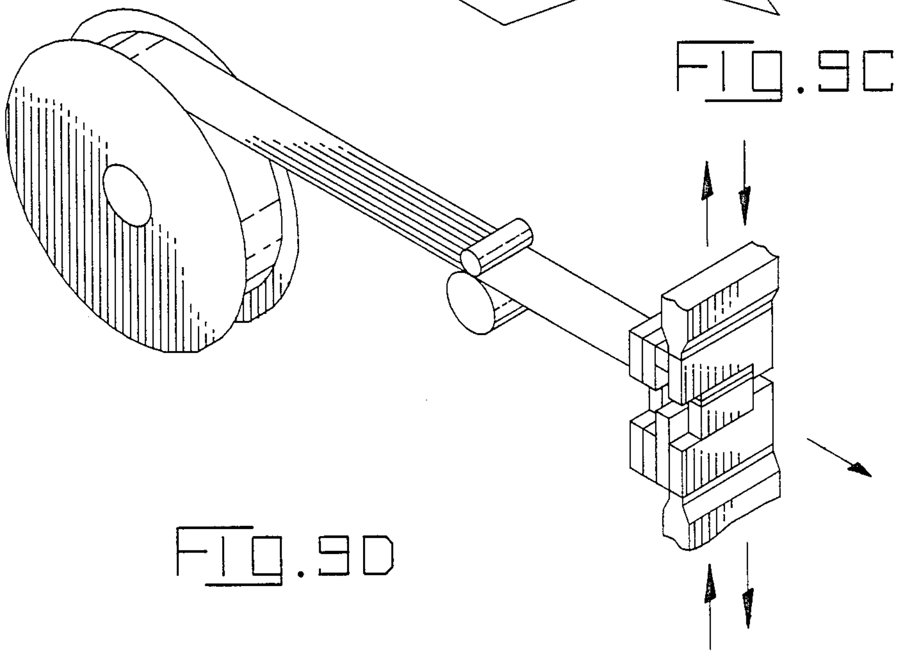

The first or leading connector is terminated, FIG. 9D. An electrical check is then performed for short or open circuits. Failure of this test will abort the assembly. That is, the cable is sheared or cut off and transported to a reject location. If the test is positive, i.e. no short or open circuit, the cable is advanced downstream, such as by moving the leading terminated connector, a predetermined distance. It will be understood that such distance represents the distance or length of cable between the leading connector and first intermediate connector, or the end thereof for a single connector harness. As noted previously, the apparatus hereof is preferably designed to produce a cable harness assembly containing multiple connectors, i.e. one at each end, and optionally one or more intermediate connectors. However, for certain applications, only a single connector may be desired. For such a case, it is still possible to test the cable for continuity. At such downstream location, the cable is sheared. At the moment of shearing, the electrically conductive shear blade may be used as the ground connection for the continuity testing.

Returning now to the preferred multiple connector assembly, at the above noted downstream location, the first intermediate connector is terminated to the cable. A second electrical check is performed for short or open circuits, along with a check for electrical continuity between the terminated connectors. Failure of either of such electrical checks will abort the assembly as described above. This operation is repeated for each additional intermediate connector.

Figure 9E:
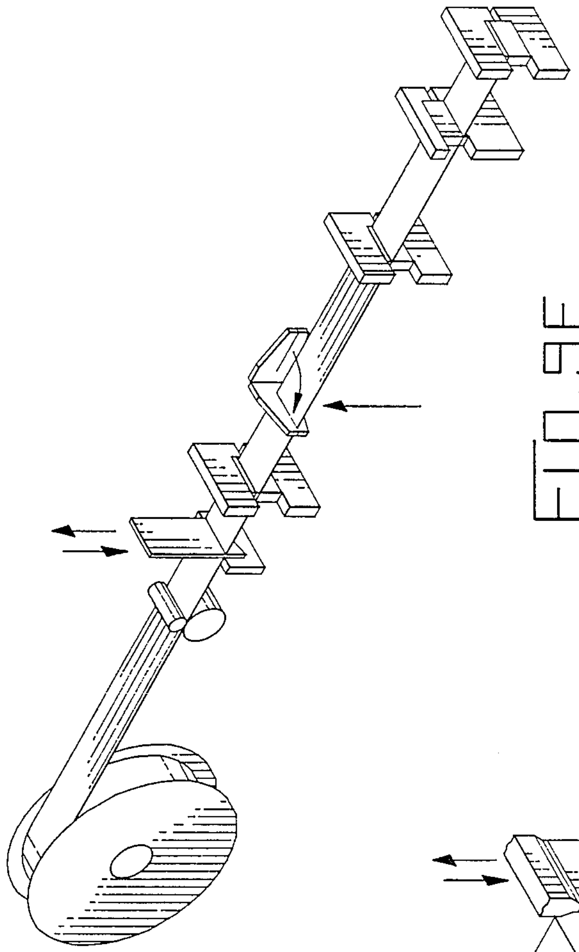
Figure 9F:
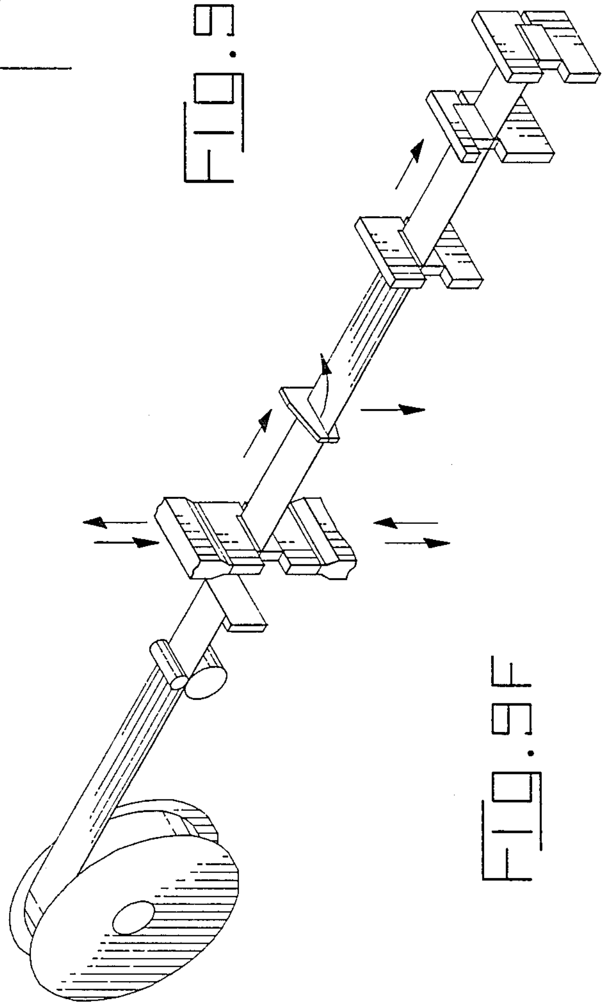

The final steps for the manufacture and testing of the cable harness assembly are depicted in FIGS. 9E and 9F. FIG. 9E, for example, additionally shows the use of the auxiliary cable support to eliminate cable sag during the final termination step. With such support in position, for example, the cable is sheared and advanced into the trailing connector where such connector is terminated, (FIG. 9F) to the cable. A final electrical check is performed for short and open circuits, along with a final continuity check. The auxiliary cable support is then pivoted out of a supporting position to free the cable. In the situation of multiple connectors, only the leading module, with the electrical probes inserted into the terminated connector, is securely latched during the cable harness assembly operation. The remaining modules used in the assembly operation are spring loaded. Thus, to free the cable harness assembly from the apparatus, it is only necessary to withdraw such probes and unlatch the leading module. By means to be described hereinafter, it is now possible to move the harness assembly. In any case, at this juncture, the cable has been fully terminated, tested, and ready for transport to the accept/reject station.

Figure 9G:
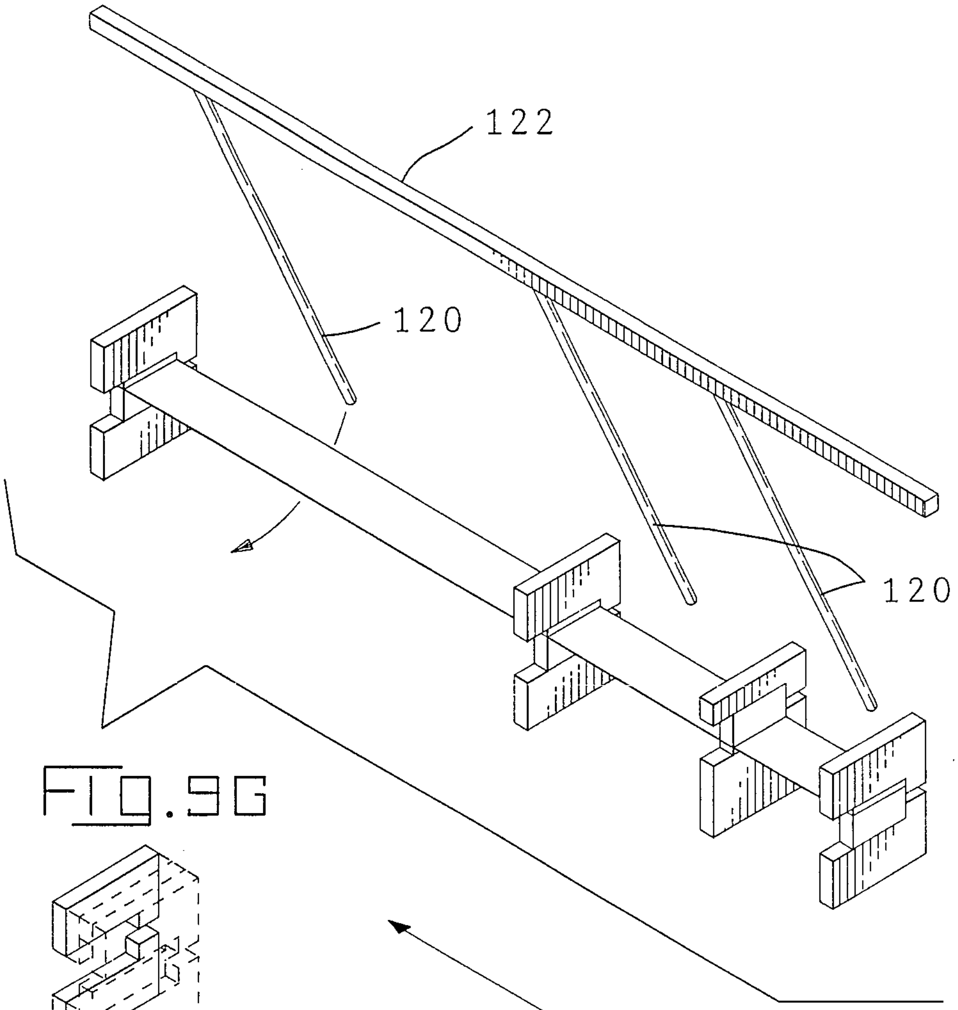
Figure 9H:
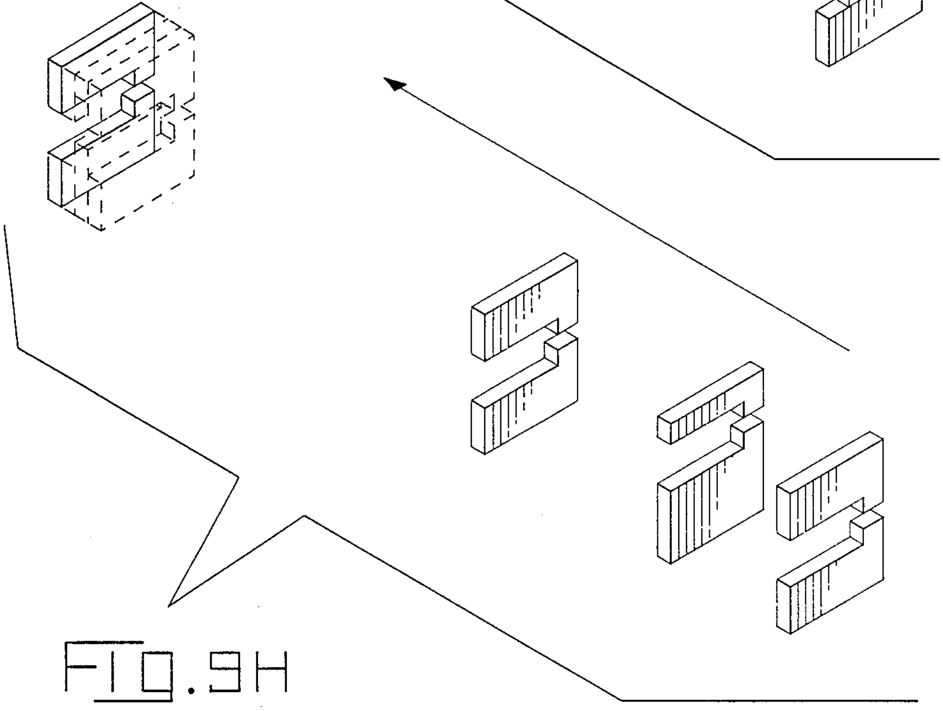

In FIG. 9G there is illustrated an ejection unit comprising a number of eject arms 120 that are adapted to sweep the assembled cable out of the modules at the end of the assembly cycle. That is, the connectors of the cable harness assembly are seated in their respective modules and are now free to slip or slide out through the opening thereof used in loading the modules. The arms are adjustable along a shaft/crank assembly 122 which is mounted above the carriage path. A bin, not illustrated, with a cylinder actuated door provides a suitable means for separating acceptable assemblies from rejected ones. After such ejection, the connector modules return to the work station area, as shown in FIG. 9H, to begin the cycle again.

FIG. 10, at the right side thereof, is a simplified schematic of the electrical circuitry for the testing apparatus of this invention. Additionally, a preferred programming sequence is presented describing the operation of this invention.

Briefly, the microprocessor 130 is the control unit for the apparatus hereof. By virtue of the sequence instructions contained within a program in the microprocessor 130, instructions are transmitted to the various test probes through the output opto 132, which as used herein may comprise a signal converter, such as a transducer to convert an electrical signal to an optical signal, or visa versa. Through the input opto 134, signals are transmitted to the microprocessor 130 as to the results which are being read. If such results are negative, the harness assembly process is aborted, and the assembly operation is initiated from the beginning. If the results are positive, the operation continues to the next step in the sequence.

It should be apparent from the schematic of FIG. 10 that additional probes may be readily incorporated into the system of this invention. Alternatively, if only a single connector is used, the second probe would represent the continuity testing at the shear station, as discussed previously. While the electrical circuitry for the testing apparatus of the present invention is briefly set forth herein, any suitable circuitry that is well-known in the art may be advantageously utilized. The circuitry and probes described in the aforementioned Peppler et al. patent, for example, would be suitable.

We claim:

1. Electrical connector terminating and testing apparatus for planar multi-conductor cable, wherein a cable section of predetermined length is terminated by at least one pressembled connector, said connector consisting of a housing portion containing a plurality of insulation displacement terminals and a cover portion in sliding engagement with said housing portion from a first position wherein an opening exists between the two portions for receiving said cable section therein and a second position wherein the two portions are in cable terminating engagement; said apparatus including a connector terminating station and an electrical testing means for detecting the presence of short circuits or open circuits within a terminated connector, between terminated connectors, and between a terminated connector and said cable shearing means, and arranged so that when said short or open circuits are present, said cable section is severed and discarded, said connector terminating station having:

a plurality of connector modules arranged for holding a plurality of said connectors with their two portions in said first position and their openings in mutual alignment for receiving said cable section;

a single press for engaging one of said modules and terminating a connector contained therein to said cable section; and means for moving each of said modules in seriatim into operating engagement with said single press.

2. The electrical connector terminating and testing apparatus according to claim 1 wherein each said module is c-shaped thereby defining an opening therein and means are included for inserting a connector into said opening, and for removing a cable terminated connector therefrom.

3. The electrical connector terminating and testing apparatus according to claim 2 wherein said means for removing said cable terminated connector comprises a plurality of pivotal members positioned to slide said connectors out of the opening of said c shaped module.

4. The electrical connector terminating and testing apparatus according to claim 1 including means to support said cable during the manufacture thereof.

5. The electrical connector terminating and testing apparatus according to claim 4 wherein said cable support means includes a pair of jaws adapted to clamp said cable, and means to move said jaws into and out of a cable clamping position.

6. The apparatus according to claim 2 wherein said means for inserting comprises:

(a) a vertically disposed column having a stack of said connectors therewithin and an opening at its lower extremity through which a single one of said connectors may be dispensed;

(b) a load guide having an upwardly facing cavity adjacent to and in substantial alignment with said opening of said c-shaped module;

(c) a first ram adjacent said opening of said column arranged to push said single connector through said opening of said column and into said upwardly facing cavity; and (d) a second ram adjacent said load guide arranged to push said connector through said upwardly facing cavity and into said opening of said c-shaped module.

7. The apparatus according to claim 6 including guide means interposed said opening of said column and said upwardly facing cavity so that after said first ram pushes said connector through said opening of said column, said connector rotates substantially 90 degrees within said guide means prior to entering said upwardly facing cavity.

8. The apparatus according to claim 7 wherein said connector is moving solely under the influence of gravity during said rotation through 90 degrees and during entering said upwardly facing cavity.

9. The apparatus according to claim 6 wherein said load guide includes a plurality of upwardly facing cavities each of which is adjacent to and in substantial alignment with a respective one of said openings of said c-shaped modules, the apparatus including a plurality of said vertically disposed columns and associated said first rams arranged to push a single connector through said opening of a selected column into a selected upwardly facing cavity, and wherein said second ram is further arranged to simultaneously push all of said connectors contained in said upwardly facing cavities into said respective openings of said c-shaped modules.

* * * * *